(12) United States Patent
Johnson

(10) Patent No.: US 10,479,155 B2
(45) Date of Patent: Nov. 19, 2019

(54) CLADDING STRUCTURE AND METHOD

(71) Applicant: Caterpillar Inc., Peoria, IL (US)

(72) Inventor: John Johnson, Dilworth, MN (US)

(73) Assignee: Caterpillar Inc., Peoria, IL (US)

( * ) Notice: Subject to any disclaimer, the term of this patent is extended or adjusted under 35 U.S.C. 154(b) by 134 days.

(21) Appl. No.: 15/435,221

(22) Filed: Feb. 16, 2017

(65) Prior Publication Data

US 2018/0229565 A1    Aug. 16, 2018

(51) Int. Cl.
| | | |
|---|---|---|
| *B60G 7/00* | (2006.01) | |
| *B23K 26/34* | (2014.01) | |
| *B23K 9/04* | (2006.01) | |
| *B33Y 80/00* | (2015.01) | |
| *B33Y 10/00* | (2015.01) | |
| *B62D 55/20* | (2006.01) | |
| *B62D 55/14* | (2006.01) | |
| *F16H 55/00* | (2006.01) | |
| *F16C 3/00* | (2006.01) | |
| *B23K 101/00* | (2006.01) | |

(52) U.S. Cl.
CPC ............ *B60G 7/001* (2013.01); *B23K 9/04* (2013.01); *B23K 26/34* (2013.01); *B33Y 10/00* (2014.12); *B33Y 80/00* (2014.12); *B23K 2101/006* (2018.08); *B60G 2206/10* (2013.01); *B62D 55/14* (2013.01); *B62D 55/20* (2013.01); *F16C 3/00* (2013.01); *F16H 55/00* (2013.01)

(58) Field of Classification Search
CPC .... B60G 7/001; B60G 2206/10; B33Y 10/00; B33Y 80/00; B23K 9/04; B23K 26/34; B23K 2101/006; B23K 2201/006; B62D 55/14; B62D 55/20; F16C 3/00; F16H 55/00
USPC .......................................... 248/554–555, 637
See application file for complete search history.

(56) References Cited

U.S. PATENT DOCUMENTS

| | | | | |
|---|---|---|---|---|
| 4,243,727 | A | * | 1/1981 | Wisler ...................... C23C 4/06 |
| | | | | 175/374 |
| 5,852,272 | A | | 12/1998 | Amano |
| 9,187,166 | B2 | | 11/2015 | Klahn et al. |
| 2011/0226390 | A1 | * | 9/2011 | Chen ....................... C22C 19/00 |
| | | | | 148/527 |
| 2014/0242400 | A1 | | 8/2014 | Hoebel et al. |
| 2014/0299585 | A1 | | 10/2014 | Li et al. |
| 2017/0334025 | A1 | * | 11/2017 | Reimers .................. B23K 9/04 |

FOREIGN PATENT DOCUMENTS

| | | |
|---|---|---|
| CN | 102627411 A | 8/2012 |
| CN | 104816093 A | 8/2015 |
| CN | 105798471 A | 7/2016 |
| EP | 0399559 B1 | 8/1993 |
| JP | 5239366 B2 | 7/2013 |
| WO | 2013000237 | 1/2013 |

* cited by examiner

*Primary Examiner* — Christopher Garft
(74) *Attorney, Agent, or Firm* — Jonathan F. Yates

(57) ABSTRACT

A cladding structure and method for cladding machine components to inhibit crack propagation includes at least one set of primary bands, with each primary band being deposited adjacent to and abutting at least one other primary band, forming at least one inter-pass clad boundary, and at least one set of secondary bands deposited in a spaced configuration and oriented so as to intersect at least one inter-pass clad boundary.

15 Claims, 5 Drawing Sheets

CLADDING STRUCTURE AND METHOD

TECHNICAL FIELD

The present disclosure relates generally to the field of machine component cladding and, more particularly, to cladding machine components to inhibit crack propagation.

BACKGROUND

Machine components such as struts, shafts, frame components, links, rotors, discs, plates, and all manner of others are often subjected to "cyclic loading" during service. Cyclic loading may cause the materials to prematurely fatigue, thereby lowering the nominal maximum stress value that can cause failure, such as cracking, plastic deformation, certain types of wear, or the like. Machine components subjected to cyclic loading are often closely monitored while in service, as undetected material failures may rapidly propagate if subjected to continued loading, potentially causing catastrophic failure of the machine component. Detection of material failures in machine components may be difficult and costly, however, especially in complex machines. As such, preventing material failure or at least reducing fatigue phenomena has long been an object of those endeavoring to extend the service life of machine components.

One strategy for increasing resistance to fatigue includes cladding machine components with a cladding material. Cladding the machine component may make the component more resistant to damage or failure by distributing stresses more uniformly across or through the materials of the machine component, and thereby reducing localized stress concentrations.

One attempt to prevent crack formation is disclosed in Chinese Patent Application Publication No. 104816093 to Yao et al. ("Yao"). Yao discloses a method for laser cladding an interior surface of a valve. In Yao, a spiral patterned laser clad is deposited on a non-sealing surface of a valve in order to prevent the formation of crater cracks in the valve. While this and other solutions may prevent the formation of some cracks or other types of material failures having various root causes, at least in certain machine components, improved and/or alternative strategies for preventing cracks from forming and also inhibiting the propagation of any cracks that do form remain desirable.

SUMMARY OF THE INVENTION

In one aspect, a machine component includes a core having at least one fatigue sensitive region and at least one fatigue insensitive region, and a cladding extending throughout the at least one fatigue sensitive region. The cladding is formed by a set of primary bands of cladding material deposited upon and bonded to the core, and a set of secondary bands of cladding material deposited upon and bonded to the core. Each of the primary bands are adjacent to and abutting at least one other primary band, and each of the secondary bands are oriented transverse to the primary bands to inhibit propagation of cracks through the cladding along directions of the primary bands.

In another aspect, a machine component includes a core and a cladding upon the core having a set of primary bands and a set of secondary bands. The primary bands are oriented adjacent to and abutting at least one other primary band, such that an inter-pass clad boundary extends between adjacent ones of the primary bands, and the secondary bands are spaced apart from one another and each oriented so as to intersect at least one of the inter-pass clad boundaries.

In still another aspect, a method for cladding a workpiece includes forming a set of primary cladding bands on a core of the workpiece such that a plurality of inter-pass clad boundaries extend between adjacent ones of the set of primary cladding bands, and forming a set of secondary cladding bands transverse to the primary cladding bands, such that the secondary cladding bands intersect at least one inter-pass clad boundary to inhibit crack propagation in the direction of the at least one inter-pass clad boundary.

DETAILED DESCRIPTION

Figure 1:
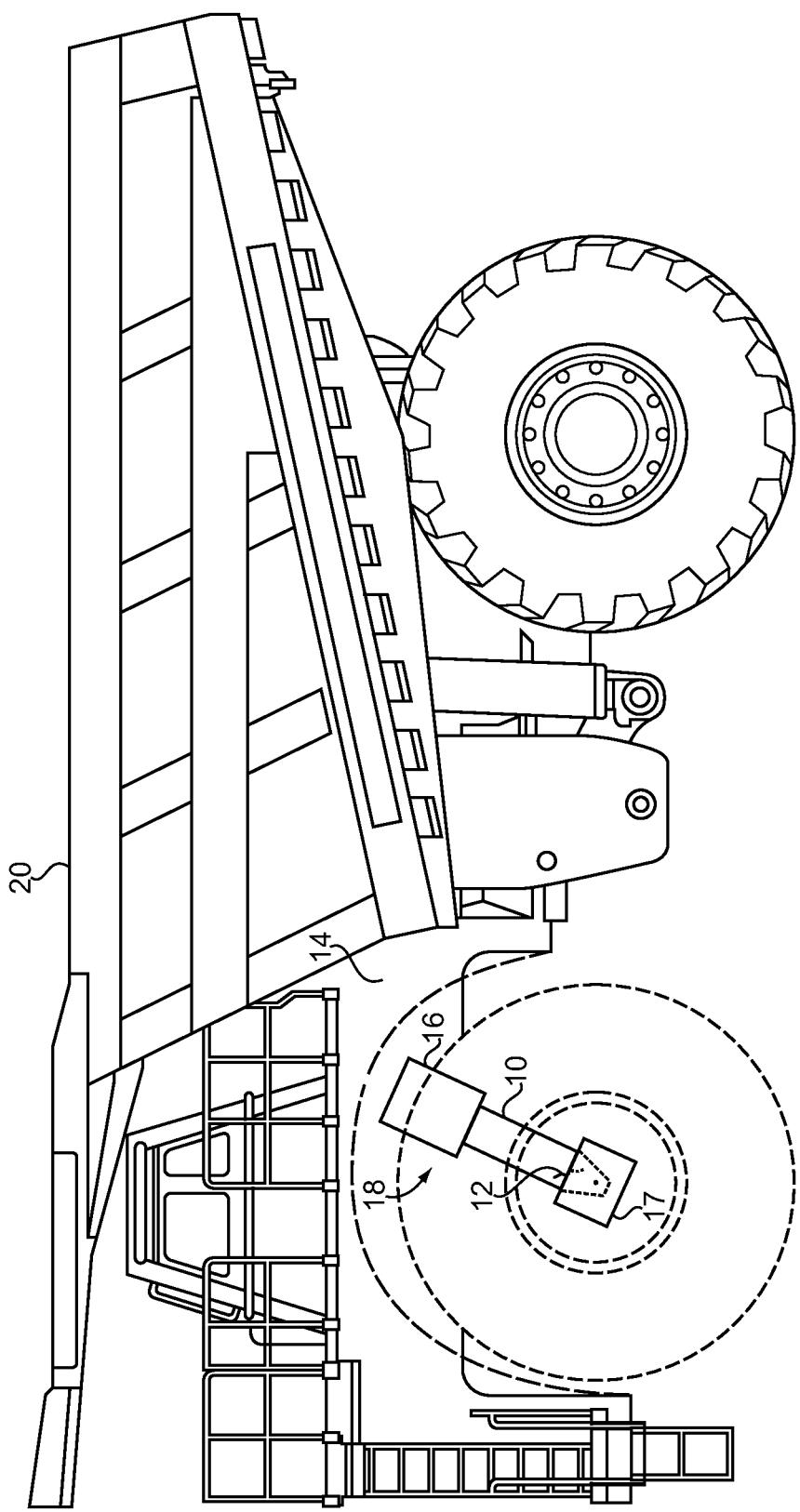
FIG. 1 is a diagrammatic view of a machine component in service in a machine, according to one embodiment.
Figure 2:
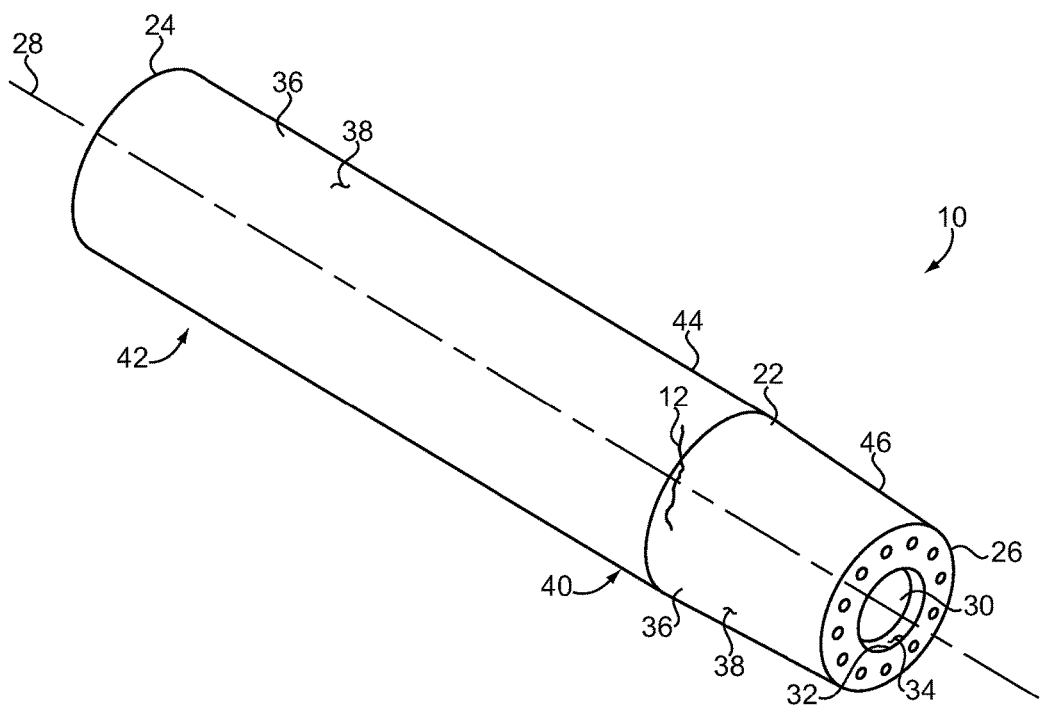
FIG. 2 is a diagrammatic view of a machine component removed from service, according to one embodiment.

Referring to FIG. 1, a view of a machine component 10 having a crack 12 is shown in service according to one embodiment. Machine component 10 of the present embodiment includes a strut (hereinafter "strut 10") forming part of a strut assembly 18 in a suspension system of a machine 20, such as a mining truck or other type of off-highway machine, an on-highway machine, or a stationary machine. In some embodiments, the machine component may be another type of shaft or shaft-like structure subjected to loading in a different service environment, such as an axle, a support rod, a piston, a beam, or still others. Referring now also to FIG. 2, strut 10 is shown having been removed from service. Strut 10 may include a body 22. Body 22 of the present embodiment may include an elongate shaft (hereinafter "elongate shaft 22") defining a longitudinal axis 28 extending between a first end 24 and a second end 26, with an opening 30 defined by elongate shaft 22 in second end 26, second end 26 structured to be received by a spindle 17 and first end 24 structured to be received by a housing element 16. Housing element 16 may be coupled with a frame 14, thereby enabling strut assembly 18 to be mounted in machine 20. Elongate shaft 22 may also include a core 32 formed of a core material 34 and a cladding 36 formed of a cladding material 38.

It has been observed that certain types of machine components, or machine components used in certain service environments, such as strut 10, may have one or more fatigue sensitive regions 40 either as a result of the geometry, material composition(s), or service environment. Fatigue sensitivity may arise as an inherent property of a machine component, but in other instances could develop over time. Stresses may concentrate in fatigue sensitive regions in response to an applied load. Machine components may further have one or more fatigue insensitive regions 42 in which stresses may be more evenly distributed. It should be appreciated that fatigue sensitivity and fatigue insensitivity are terms that are used herein in a relative sense, in relation to each other. Cyclic loading, for instance, may cause premature material fatigue and/or failure, such as crack 12 in FIG. 2 for example, in core material 34 and/or cladding material 38 at fatigue sensitive region 40. In some embodiments, cyclic loading may result in other types of material failure, such as plastic deformation, wear, corrosion, creep, buckling, or the like. Descriptions herein of crack 12, or of cracks, cracking, or the like should be understood to refer to any type of permanent material failure that produces a gap or void in material, such as might result from cyclic or otherwise repeated loading, thermal cycling, or from any other cause. The present disclosure is not limited to crack inhibition or suppression, however, and other forms of material failure may be addressed through application of the teachings set forth herein.

Stress may concentrate at fatigue sensitive region 40 at least in part due to one or more stress raisers, such as a change in a dimensional or material attribute within or near fatigue sensitive region 40, like diameter, shape, microstructure, tensile strength, material composition, hardness or elasticity. A transition from a first section 44 having a first value of a dimensional or material attribute, to a second section 46 having a second value of the dimensional or material attribute might be a stress raiser, indicating an area near the transition may be fatigue sensitive. For example, fatigue sensitive region 40 may encompass or be defined by a transition between cylindrical-shaped first section 44 and conical-shaped second section 46, which may have been a factor in the formation of crack 12. In a practical implementation strategy, the fatigue sensitive region or regions may be identified on some machine components before cracking by identifying transition areas between regions that vary analogously to the examples described herein with regard to dimensional or material attributes. Areas of strut 10 in which the dimensional or material attribute is substantially uniform, such as at fatigue insensitive region 42, may allow for more uniform distribution of stress across and/or through materials 34, 38 however, making the region more resistant to fatigue. While discussions of stress fatigue in machine components 10 herein generally relate to material fatigue and/or failure resulting from uniaxial cyclical loading, the present disclosure should be understood to apply to material fatigue and/or failure that may result from any other type of loading, such as thermo-mechanical loading, or multiaxial, bending, impact, or torsional loading, for example.

While cladded machine components may be more resistant to fatigue, as mentioned above, material failure has still been observed. It has been discovered however, that inter-pass clad boundaries between parallel, abutting cladding bands may serve as propagation paths for cracks that may form in the cladding. Undiscovered cracks may continue to propagate in the machine component, eventually reaching a critical region of the machine component, which may render the machine component unsuitable for repair or remanufacture, or cause the machine component to fail during service. As such, machine components are sometimes monitored for cracks using nondestructive testing methods such as magnetic-particle inspection or dye penetrant inspection. Such techniques of course may increase maintenance and service costs due to loss of service time, and increased labor and other costs associated with regular inspections. Accordingly, cladding strategies that may inhibit crack propagation in the inter-pass clad boundaries may serve both to reduce maintenance costs and to increase the service life of machine components.

Figure 3:
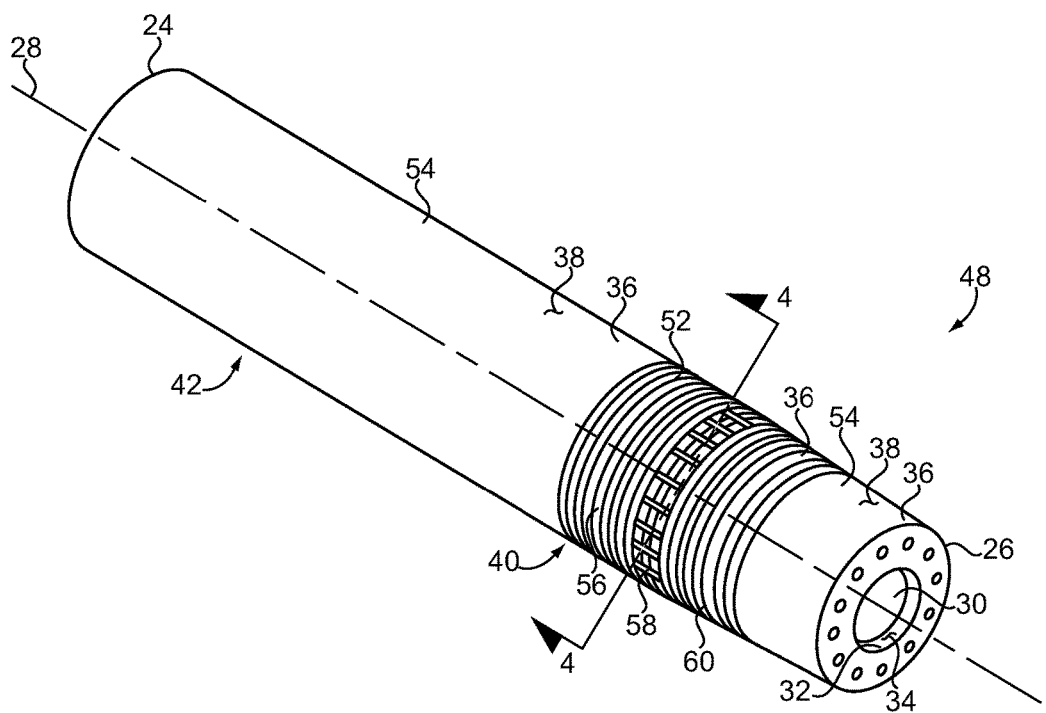
FIG. 3 is a diagrammatic view of a remanufactured machine component, according to one embodiment.

Referring now also to FIG. 3, a remanufactured machine component 48 is shown according to one embodiment, wherein remanufactured machine component 48 includes a remanufactured strut (hereinafter "remanufactured strut") 48. Remanufactured strut 48 may be substantially similar to strut 10 except that cladding 36 of remanufactured strut 48 may have a first type of segment (hereinafter "first segment") 52 and a second type of segment (hereinafter "second segment") 54. First segment 52 may have a set of primary bands 56 and a set of secondary bands 58 to inhibit crack propagation in elongate shaft 22, and thereby giving first segment 52 a patterned appearance. Primary bands 56 may be deposited on and bonded to core material 34 perimetrically and circumferentially around longitudinal axis 28 and extending in an axial direction between first end 24 and second end 26, wherein each primary band 56 wraps at least once around a perimeter of machine component 10. In a practical implementation strategy, first segment 52 may have an axial extent not less than an axial extent of fatigue sensitive region 40. Primary bands 56 may be deposited on core 32 such that each primary band 56 is adjacent to and abutting at least one other primary band 56, forming an inter-pass clad boundary 60 that extends between adjacent ones of primary bands 56. Secondary bands 58 may be deposited on and bonded to core 32 in a spaced configuration, and oriented transverse to primary bands 56, intersecting inter-pass clad boundaries 60 to inhibit propagation of cracks 12 in cladding 36 in the direction of primary bands 56 by interrupting a propagation path formed by inter-pass clad boundaries 60. An angle between a secondary band 58 and an inter-pass clad boundary 60 intersected by the secondary band 58 is from about 45 degrees to about 90 degrees. Second segment 54 of cladding 36 may have a different structure and/or appearance than first segment 52. For example, second segment 54 may not have a set of primary bands 56 and/or secondary bands 58 giving second segment 54 a unidirectional patterning, or may be formed by one continuous pass, or otherwise have a substantially smooth appearance that may be substantially free of patterning.

Figure 4:
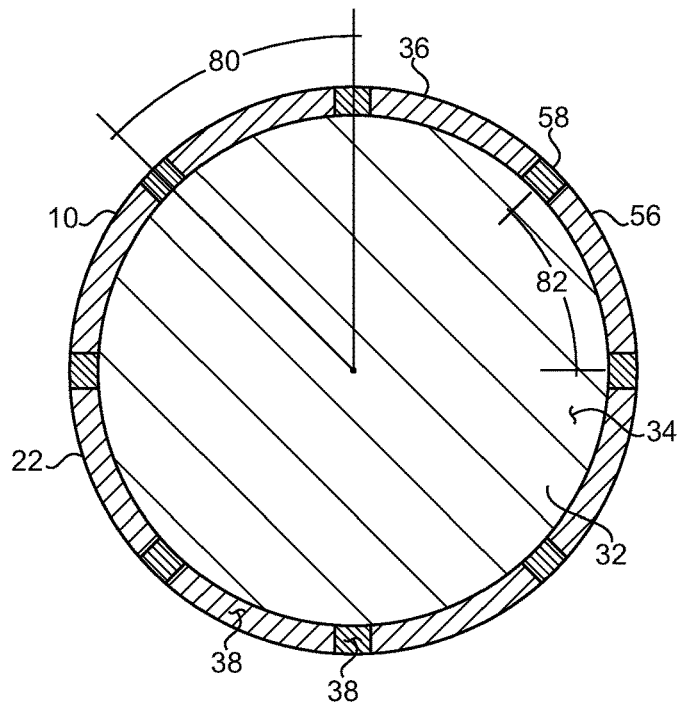
FIG. 4 is a cross-sectioned view of a remanufactured machine component, according to one embodiment.

Referring now also to FIG. 4, a cross section of remanufactured strut 48 at line 4-4 of FIG. 3 is shown. In the present embodiment, secondary bands 58 may be spaced substantially equally around longitudinal axis 28, substantially equal meaning that an arc angle 80 between midlines of consecutive secondary bands 58 are equal or are within about 2-3 degrees, wherein arc angle 80=n/360 degrees, with n being a number of secondary bands 58 deposited on core 32. As a practical implementation strategy, each consecutive pair of secondary bands 58 of the present embodiment may also have a substantially equal arc length 82 between midlines. In some embodiments, secondary bands 58 may be spaced unequally for reasons that will be apparent from the discussion herein. Primary bands 56 may be substantially linear in that they have a linear appearance from at least one perspective, for example, in a projection plane. Secondary bands 28 may be parallel to longitudinal axis 28 within cylindrical first section 44 and spaced circumferentially around longitudinal axis 28, and are inclined to longitudinal axis 28 within conical second section 46 and spaced circumferentially around longitudinal axis 28. Second segment 54 of the present embodiment may be formed or deposited on core 32 during manufacturing of strut 10. In some embodiments, second segment 54 may be deposited on core 32 after manufacture, for example, during remanufacture.

Figure 5:
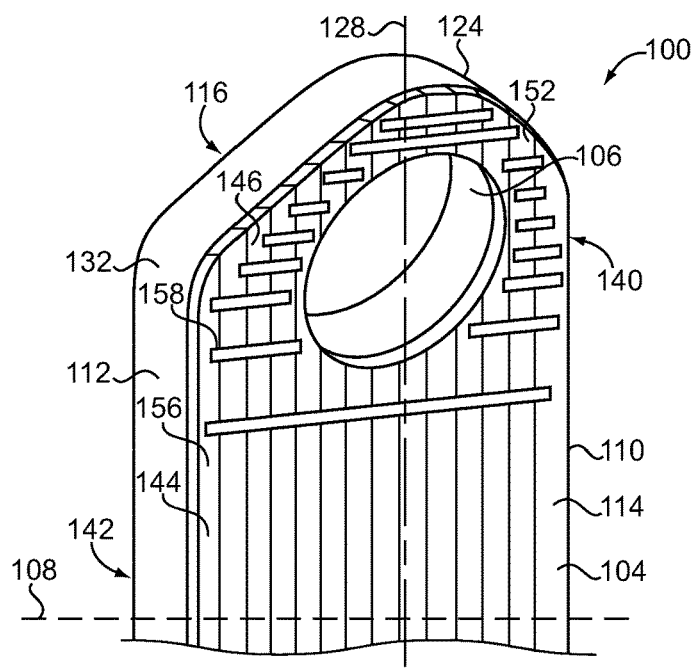
FIG. 5 is a diagrammatic view of a machine component having a first segment in a cladding, according to one embodiment.

Referring now to FIG. 5, a machine component 100 is shown according to another embodiment. Machine component 100 may have a body 104 having a substantially flat shape that defines an opening 106. Machine component 100 might be, for example, a wear plate, a structural connector, a machine frame, a hitch, or many other types of machine component. Machine component 100 of the present embodiment might also include a track link (hereinafter "link 100") or another undercarriage component. Further, in the present embodiment, body 104 may be a plate (hereinafter "plate 104"). Link 100 of the present embodiment may be a new link. In alternative embodiments, link 100 may be a used link that has been removed from service and remanufactured according to the present disclosure. Plate 104 may define a longitudinal axis 128 extending between a first end 124 and a second end (not pictured), and may define a latitudinal axis 108 oriented perpendicular to longitudinal axis 128 and extending between a right side 110 and a left side 112 of plate 104. Plate 104 may also include a top cladding 114 and a bottom cladding 116 with a core 132 disposed therebetween, top cladding 114 and bottom cladding 116 being substantially planar and substantially parallel to each other. The terms "top" and "bottom," and "right" and "left" are used herein in a relative sense, each in relation to each other when viewing link 100, and should not necessarily be taken to mean that the machine components discussed herein have a particular orientation. In some embodiments, top cladding 114 and bottom cladding 116 may be disposed at an angle to one another and/or may not be substantially planar. Opening 106 may extend between top cladding 114 and bottom cladding 116 through core 132. Link 100 might have a transition area at a fatigue sensitive region 140 from a rectangular-shaped first section 144 to an eyelet-shaped second section 146, and an area having substantially uniform geometry and material composition at a fatigue insensitive region 142. Top cladding 114 may include a first segment 152 having a set of substantially linear primary bands 156 and a set of secondary bands 158 transverse to primary bands 156. Primary bands 156 may have a similar configuration as primary bands 56 of the preceding embodiment, except that primary bands 156 of the present embodiment may be oriented parallel to longitudinal axis 128 between first end 124 and a second end instead of wrapping perimetrically around longitudinal axis 128, and may cover both fatigue sensitive region 140 and fatigue insensitive region 142. Secondary bands 158 of the present embodiment may have a similar configuration as secondary bands 58 of the preceding embodiment, except that secondary bands 158 may be spaced unevenly on and extend diametrically across plate 104 between right side 110 and left side 112 instead of wrapping perimetrically around longitudinal axis 128. In a practical implementation strategy, secondary bands 156 may be spaced unevenly on plate 104 if, for instance, some areas of fatigue sensitive region 140 may be more sensitive to stress than other areas of fatigue sensitive region 140. In some embodiments, bottom cladding 116, right side 110, and/or left side 112 may include first segment 152. In still other embodiments, first segment 152 may be deposited on core 132 perimetrically around longitudinal axis 132 or latitudinal axis 108.

Figure 6:
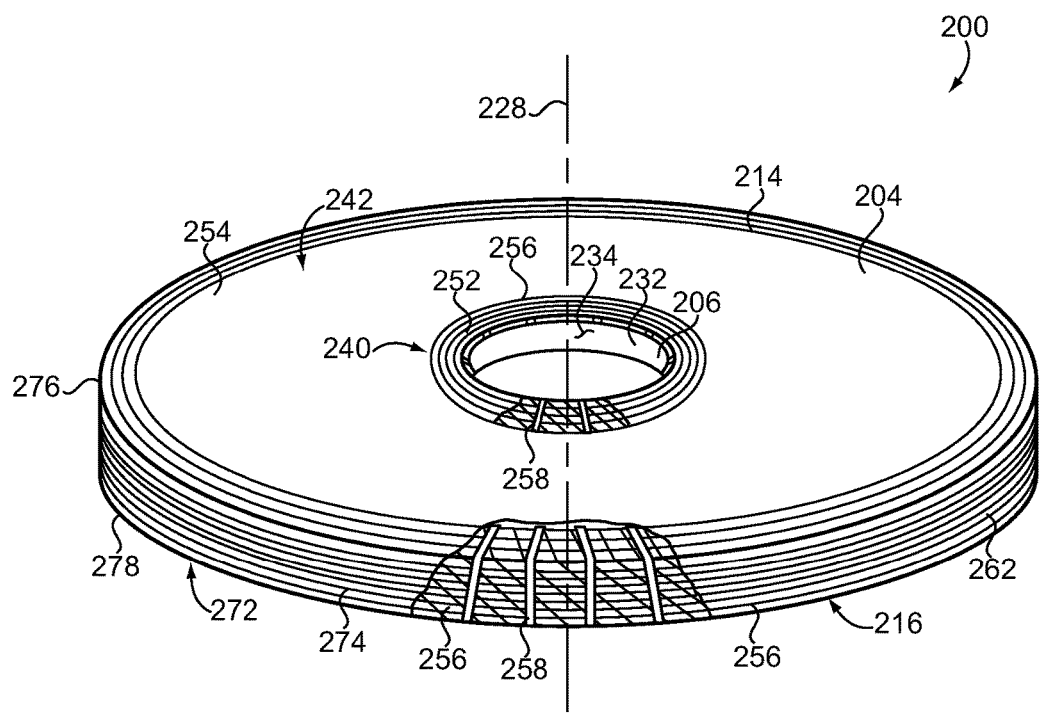
FIG. 6 is a partially sectioned diagrammatic view of a remanufactured machine component having a plurality of first segments in a cladding, according to one embodiment.

Referring now to FIG. 6, a partially sectioned remanufactured machine component 200 is shown according to another embodiment. Remanufactured machine component 200 may have a body 204 that has a substantially flat circular or oblong shape, and that may include an opening 206, for example, a track wheel, a gear, or the like. Remanufactured machine component 200 of the present embodiment may include a used disc (hereinafter "disc 200") removed from service and remanufactured according to the present disclosure. Body 204 of the present embodiment may be a plate (hereinafter "plate 204") having a top cladding 214, a bottom cladding 216, and a side cladding 262, each disposed on and bonded to a core material 234 forming a core 232. Passage 206 may extend between top cladding 214 and bottom cladding 216, through core 232. Disc 200 may define a longitudinal axis 228 extending between top cladding 214 and bottom cladding 216. Disc 200 may have multiple stress raisers. For example, disc 200 of the present embodiment may have opening 206 extending through plate 204 at a first fatigue sensitive region 240, and a sharp change in geometry at a second fatigue sensitive region 272, each of which may be a stress raiser. Plate 204 may also have a substantially uniform geometry and material composition at fatigue insensitive region 242. Top cladding 214 may include a first one of a first segment (hereinafter "medial first segment") 252 at first fatigue sensitive region 240, a second one of first segment (hereinafter "lateral first segment") 274 at second fatigue sensitive region 272, and a second segment 254 at fatigue insensitive region 242, wherein first fatigue sensitive region 240 is more medial to longitudinal axis 228 than second fatigue sensitive region 272. Medial first segment 252 may be disposed on and bonded to core material 234 at first fatigue sensitive region 240, and may have a set of non-linear primary bands 256 wrapping around longitudinal axis 228 and having a radial extent not less than a radial extent of first fatigue sensitive region 240. In some embodiments, non-linear primary bands 256 may have a different pattern, such as a wave pattern or an irregular pattern. Medial first segment 252 may also have a set of secondary bands 258, each secondary band 258 oriented substantially perpendicular to primary bands 256 with which each secondary band 258 intersects, and spaced circumferentially around and extending radially outward relative to longitudinal axis 228. Lateral first segment 274 may be disposed on and bonded to core material 234 at second fatigue sensitive region 272. Lateral first segment 274 may extend axially around a circumference of disc 200 between a top edge 276 and a bottom edge 278, and may extend beyond edges 276, 278, to cladding 214, 216, respectively. Lateral first segment 274 may include a set of primary bands 256 wrapping around longitudinal axis 228 in an adjacent and abutting configuration and extending axially between top edge 276 and bottom edge 278, and may continue beyond edges 276, 278 to form part of top cladding 214 and bottom cladding 216, respectively. Portions of lateral first segment 274 forming part of top cladding 214 and bottom cladding 216 may be configured substantially similar to medial first segment 252. In each of first segments 252, 274 of the present embodiment, primary bands 256 may be deposited on and cover secondary bands 258.

INDUSTRIAL APPLICABILITY

As suggested above, the costs of inspecting and/or servicing machines with certain components, including certain types of clad components, may be significant, not to mention the costs associated with an in-service failure. Even in situations in which costs of inspection and examination of clad parts is otherwise justified, the inability of current cladding strategies to inhibit or otherwise slow the propagation of cracks forming in the cladding can still lead to negative outcomes, such as failure of the machine component or unsuitability for remanufacturing. Application of a cladding structure having intersecting sets of bands according to the present disclosure, and as further discussed herein, has been discovered to be more effective at inhibiting crack propagation in machine components than are known cladding patterns. The cladding structure of the present disclosure therefore may reduce the cost to maintain cladded machine components due to higher confidence as to the risk of cracking and/or prevent cracks from reaching critical regions, such as core 32 of strut 10.

Figure 7:
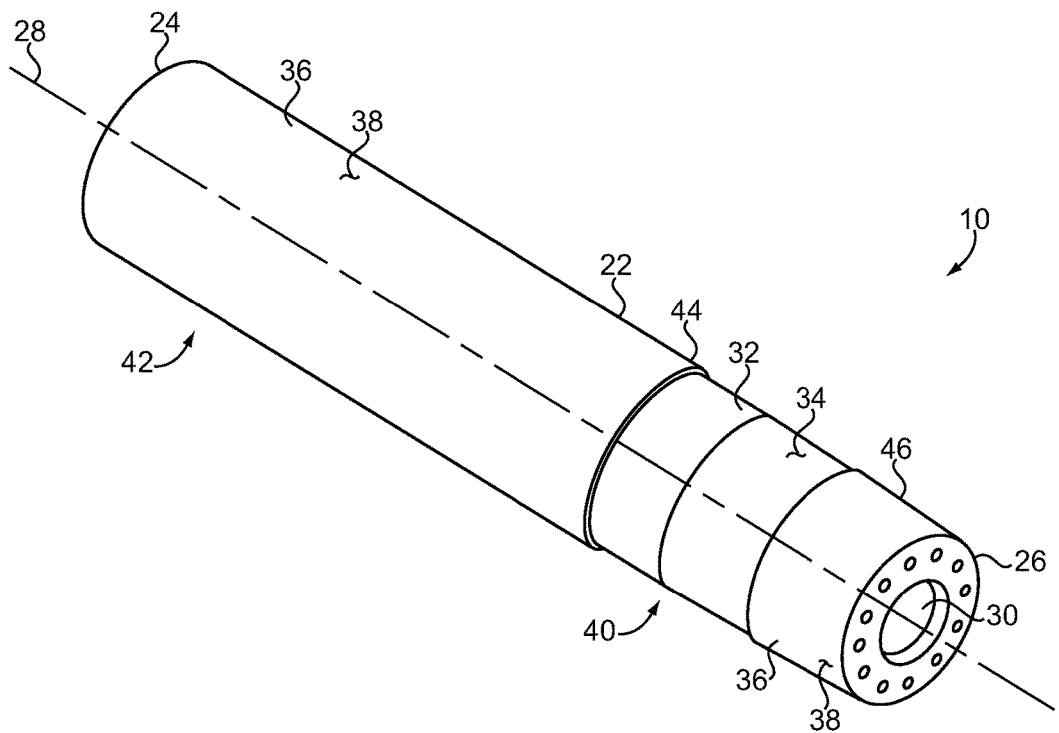
FIG. 7 is a diagrammatic view of a machine component with a cladding partially removed at one stage of processing for remanufacture, according to one embodiment.

Referring now to FIG. 7, strut 10 of FIGS. 1-2 is shown wherein cladding 36 has been removed at fatigue sensitive region 40, exposing core 32. As can be seen in FIG. 7, removing cladding 36 also removed crack 12. In some embodiments, cladding 36 may be removed from both fatigue sensitive region 40 and fatigue insensitive region 42. In still other embodiments, the machine components may be new machine components not yet provided with a cladding on the core at fatigue insensitive regions and/or fatigue sensitive regions.

Figure 8:
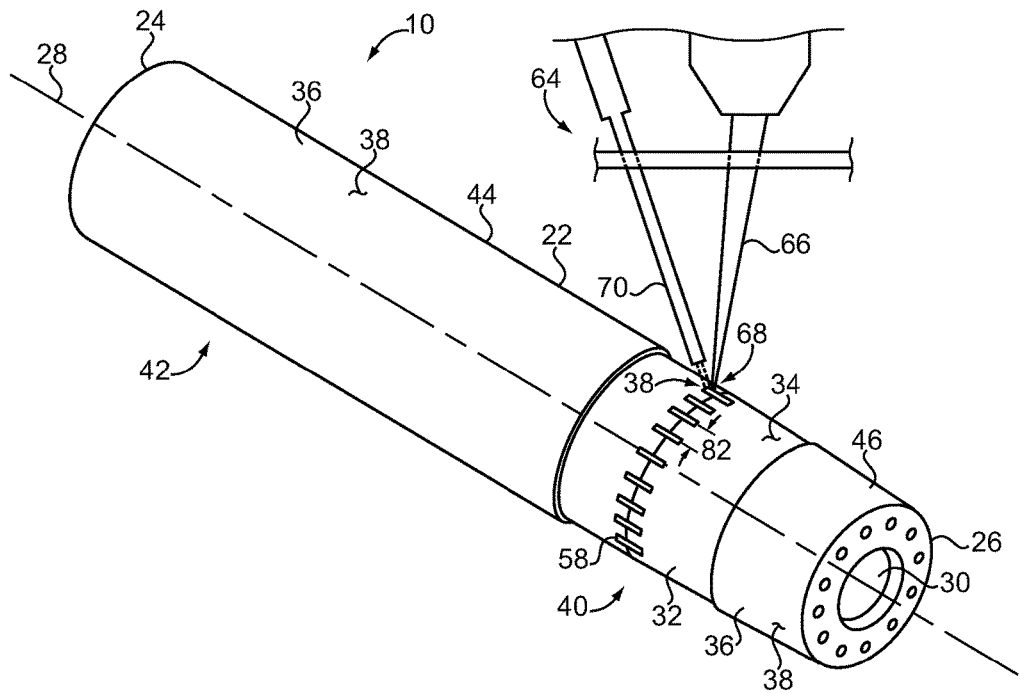
FIG. 8 is a diagrammatic view of a machine component at one stage of processing for remanufacture, according to one embodiment.
Figure 9:
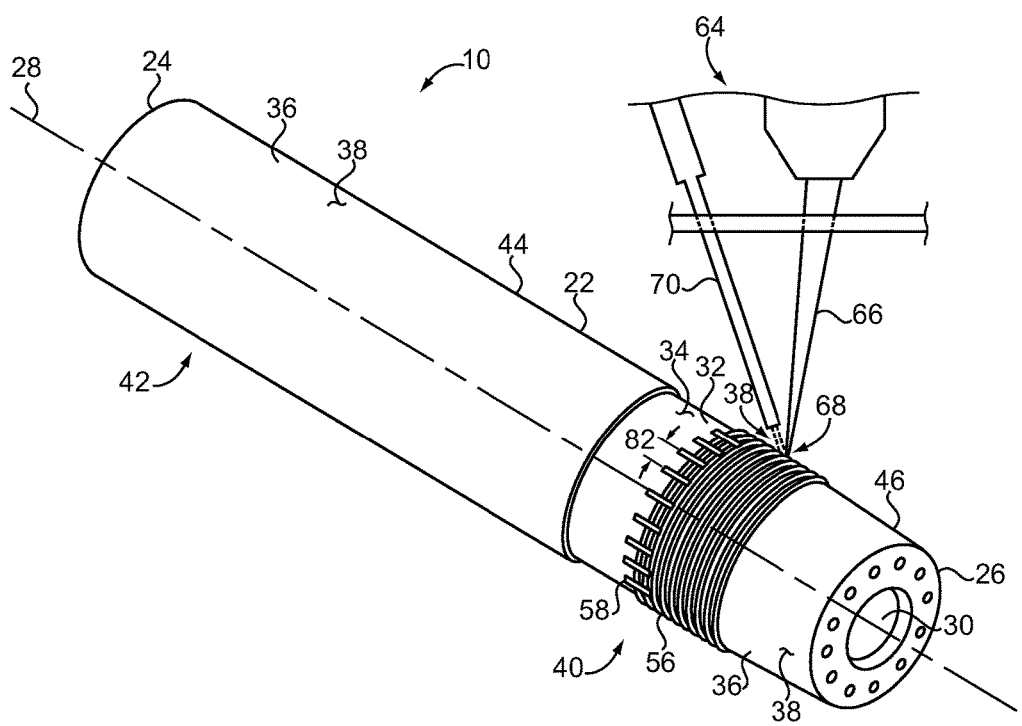
FIG. 9 is a diagrammatic view of a machine component at one stage of processing for remanufacture, according to one embodiment.

Referring now also to FIG. 8, strut 10 is shown in the process of having secondary bands 58 deposited on core 32. Secondary bands 58 of the present embodiment are deposited on and bonded to core material 34 by laser welding. A laser assembly 64 structured to generate a laser beam 66 may be positioned above fatigue sensitive region 40 such that laser beam 66 forms a melt zone 68 on core 32. Laser assembly 64 may be further structured to spray cladding material 38 in powdered form in a spray plume 70 towards melt zone 68, thereby melting cladding material 38 and depositing molten cladding material 38 on core 32. In some embodiments, cladding material 38 may be a wire or other solid form. Cladding material 38 may be a low-alloy steel, for instance, or may be any other alloy or other metallic material compatible for bonding with core material 34. Core material 34 and cladding material 38 of the present embodiment may have different material compositions. In other embodiments, core material 34 and cladding material 38 may have an identical material composition. It should be appreciated that in some embodiments, cladding material 38 may be a class of materials including, for example, a primary cladding material having a first material composition used to deposit primary bands 56 and a second cladding material having a second material composition used to deposit secondary bands 58. Laser assembly 64 of the present embodiment may be configured to deposit secondary bands 58 spaced substantially equally around longitudinal axis 28, meaning each consecutive pair of secondary bands 58 has a substantially equal arc length 82, and may be oriented parallel to longitudinal axis 28. In other embodiments, laser assembly 64 may be structured to deposit secondary bands 58 in a different configuration in accordance with the present disclosure, and reflective of the geometry of regions of core 32 on which first segment 52 may be deposited. Referring now also to FIG. 9, strut 10 is shown in the process of having primary bands 56 being deposited on and bonded to core material 34. Laser assembly 64 may be configured to deposit primary bands 56 that wrap around core 32, extending circumferentially around longitudinal axis 32 according to the present disclosure. In other embodiments, laser assembly 64 may be configured to deposit primary bands 56 in a different configuration in accordance with the present disclosure. Primary bands 56 may be deposited on core 32 until core 32 is covered by first segment 52, resulting in remanufactured strut 48. In some embodiments, cladding 36 may be deposited on core 36 by other techniques, such as arc welding, fusion welding, or the like.

Once core 32 is covered with cladding 36, first segment 52 and/or second segment 54 may be machined a specification. In alternative embodiments, remanufactured strut 48 might not be machined to the specification. Referring now again to FIG. 4, a cross section of remanufactured strut 48 at line 4-4 of FIG. 8 is shown after machining. Secondary bands 58 are spaced uniformly on core 32 around longitudinal axis 28. Primary bands 56 wrap around a circumference of core 32, and are interrupted and intersected by secondary bands 58, which may inhibit crack propagation along inter-pass clad boundaries 60. These principles and the disclosed geometry can also be seen in other machine component embodiments according to the present disclosure. It should thus be appreciated that the description herein of any single one of the embodiments of the present disclosure can be taken to apply to any other one of the embodiments of the present disclosure except where indicated otherwise or apparent from the context.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. As noted above, the teachings set forth herein are applicable to a variety of different machine components having a variety of different structures than those specifically described herein. Other aspects, features and advantages will be apparent upon an examination of the attached drawings and appended claims. As used herein, the articles "a" and "an" are intended to include one or more items, and may be used interchangeably with "at least one." Where only one item is intended, the term "one" or similar language is used. Also, as used herein, the terms "has," "have," "having," or the like are intended to be open-ended terms.

What is claimed is:

1. A machine component comprising:
    a body including a one-piece core formed of a core material and having at least one fatigue sensitive region and at least one fatigue insensitive region, and
    a cladding formed upon the one-piece core and extending throughout the at least one fatigue sensitive region;
    the cladding being formed by a set of primary bands of cladding material deposited upon and bonded to the one-piece core in contact with the core material, and a set of secondary bands of cladding material deposited upon and bonded to the one-piece core in contact with the core material;
    each of the primary bands being adjacent to and abutting at least one other primary band; and
    each of the secondary bands being oriented transverse to a plurality of the primary bands to inhibit propagation of cracks within an inter-pass clad boundary formed between adjacent ones of the primary bands; and
    each of the secondary bands being spaced apart from one another and each oriented so as to interrupt at least one of the inter-pass clad boundaries.

2. The machine component of claim 1 wherein the body includes an elongate shaft defining a longitudinal axis extending between a first end of the elongate shaft and a second end of the elongate shaft, and wherein the at least one fatigue sensitive region includes an axial segment of the elongate shaft that extends circumferentially around the longitudinal axis, and at least one of the set of primary bands or the set of secondary bands has an axial extent not less than an axial extent of the at least one fatigue sensitive region.

3. The machine component of claim 2 wherein the one-piece core has a cylindrical section and a conical section, and the fatigue sensitive region is formed at least in part by a transition between the cylindrical section and the conical section.

4. The machine component of claim 3 wherein the secondary bands are parallel to the longitudinal axis within the cylindrical section and spaced circumferentially around the longitudinal axis, and wherein the secondary bands are inclined to the longitudinal axis within the conical section and spaced circumferentially around the longitudinal axis.

5. The machine component of claim 2 wherein the machine component is a strut having an opening formed in the second end of the elongate shaft.

6. A machine component comprising:
   an elongate body defining a longitudinal axis, the elongate body including a core formed of a core material, and
   a cladding upon the core, the cladding including a set of primary bands and a set of secondary bands, and each of the set of primary bands and the set of secondary bands being in contact with the core material;
   the primary bands being oriented adjacent to and abutting at least one other primary band, such that an inter-pass clad boundary extends between adjacent ones of the primary bands, the adjacent ones of the primary bands extending at least 360 degrees around the longitudinal axis such that the inter-pass clad boundary forms a continuous boundary around the machine component;
   the set of secondary bands being spaced apart from one another and each oriented so as to interrupt at least one of the inter-pass clad boundaries; and
   at least one of the inter-pass clad boundaries being uninterrupted by the set of secondary bands.

7. The machine component of claim 6 wherein an angle between each of the secondary bands and the at least one inter-pass clad boundary is from 45 degrees to 90 degrees.

8. The machine component of claim 6 wherein each of the primary bands wraps at least once around a perimeter of the machine component.

9. The machine component of claim 2 wherein an axial extent of the set of primary bands is greater than an axial extent of the set of secondary bands.

10. The machine component of claim 8 wherein an axial extent of the set of primary bands is not less than an axial extent of the set of secondary bands.

11. The machine component of claim 6 further including a fatigue sensitive region and a fatigue insensitive region, wherein the cladding extends throughout the fatigue sensitive region into the fatigue insensitive region such that at least one of the primary bands is upon the core within the fatigue insensitive region.

12. The machine component of claim 11 wherein the fatigue sensitive region includes a transition from a first type of material to a second type of material.

13. The machine component of claim 6 wherein the set of secondary bands are bonded to the core.

14. The machine component of claim 6 wherein the cladding includes a first type of segment and a second type of segment, the first type of segment having a patterned appearance and including the set of primary bands and the set of secondary bands, and the second type of segment having a substantially smooth appearance substantially free of patterning.

15. The machine component of claim 14 wherein the machine component is a remanufactured machine component having a core removed from service in a machine, the second type of segment of the cladding having the same composition as the core.

* * * * *